3,817,814
INDEXING APPARATUS
George W. Loy, Scio, Ohio, assignor to
Scio Cabinet, Inc., Scio, Ohio
Application Feb. 10, 1971, Ser. No. 114,290, now Patent
No. 3,690,995, which is a division of application Ser.
No. 885,014, Dec. 15, 1969, now Patent No. 3,580,787.
Divided and this application July 7, 1972, Ser. No.
269,609
Int. Cl. B32b 31/00
U.S. Cl. 156—556
10 Claims

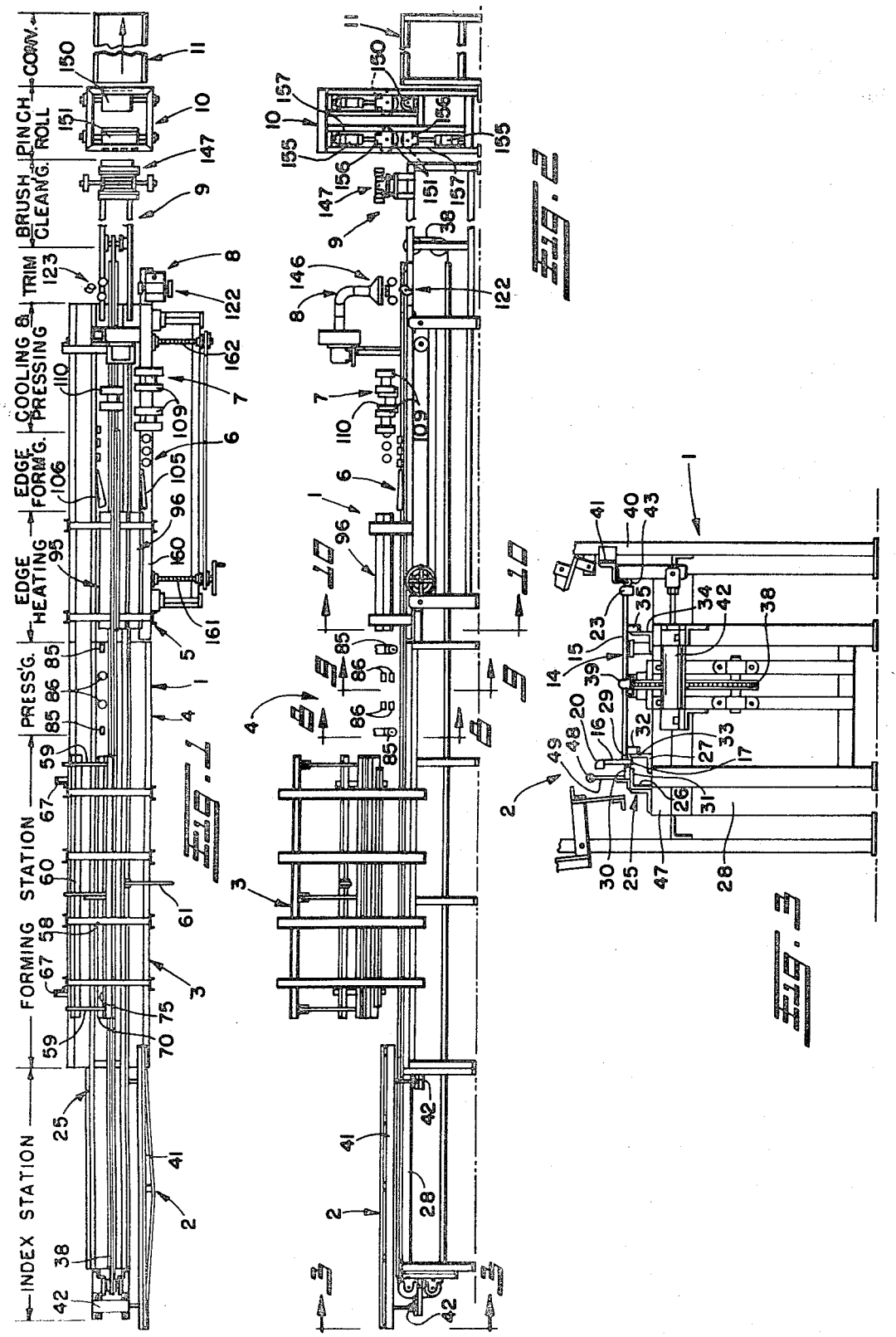

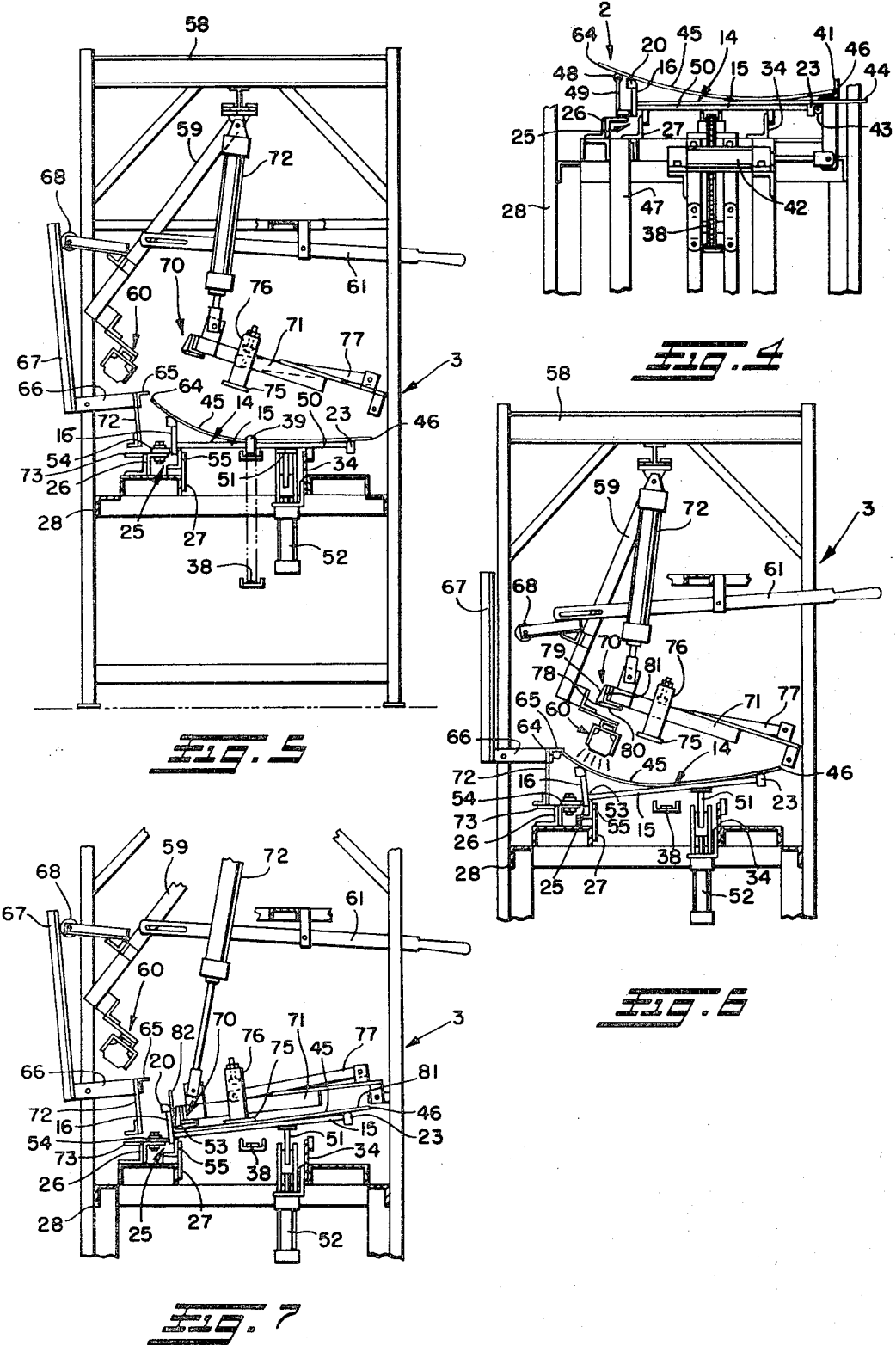

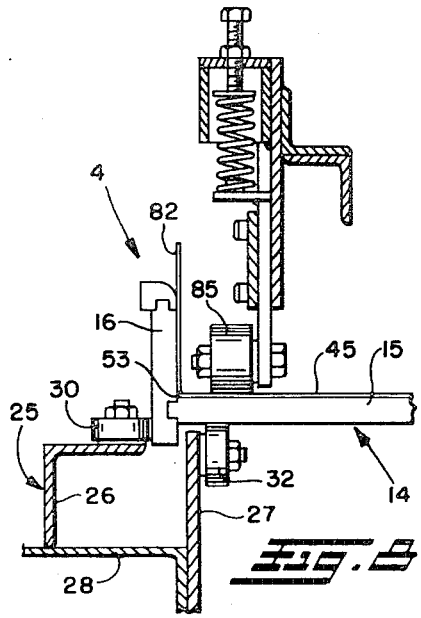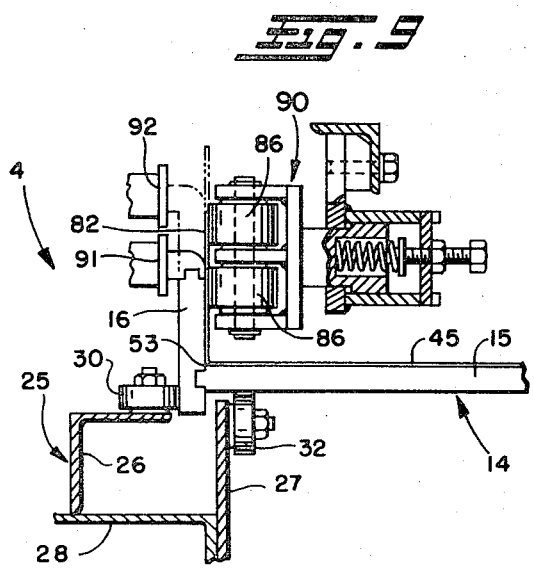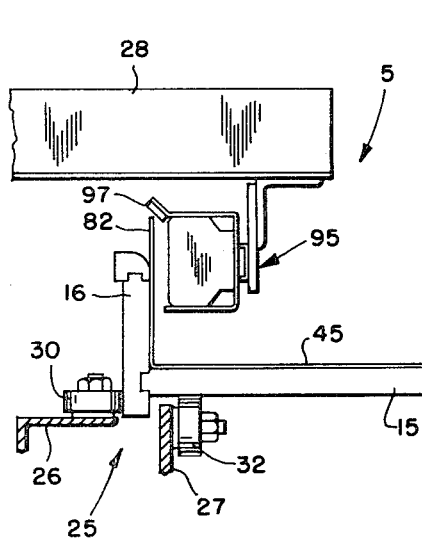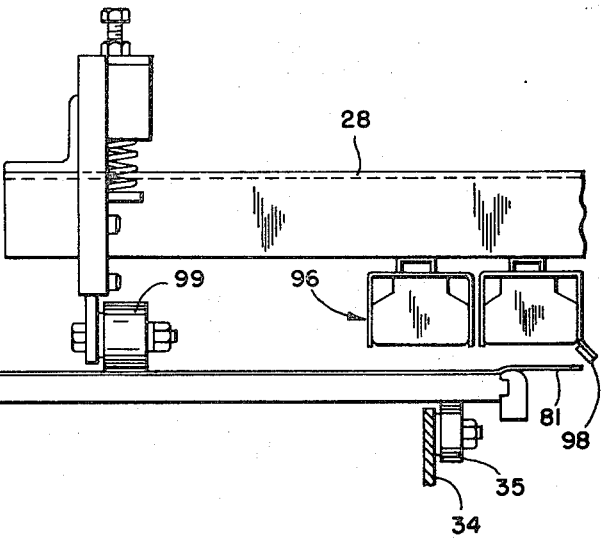

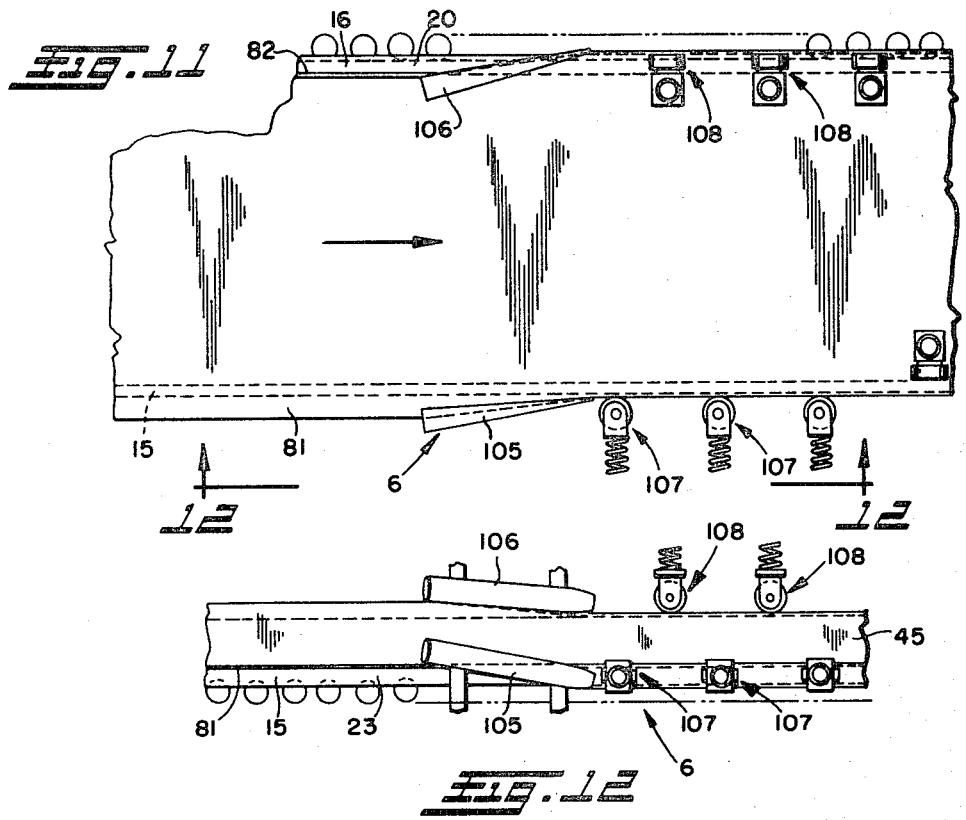
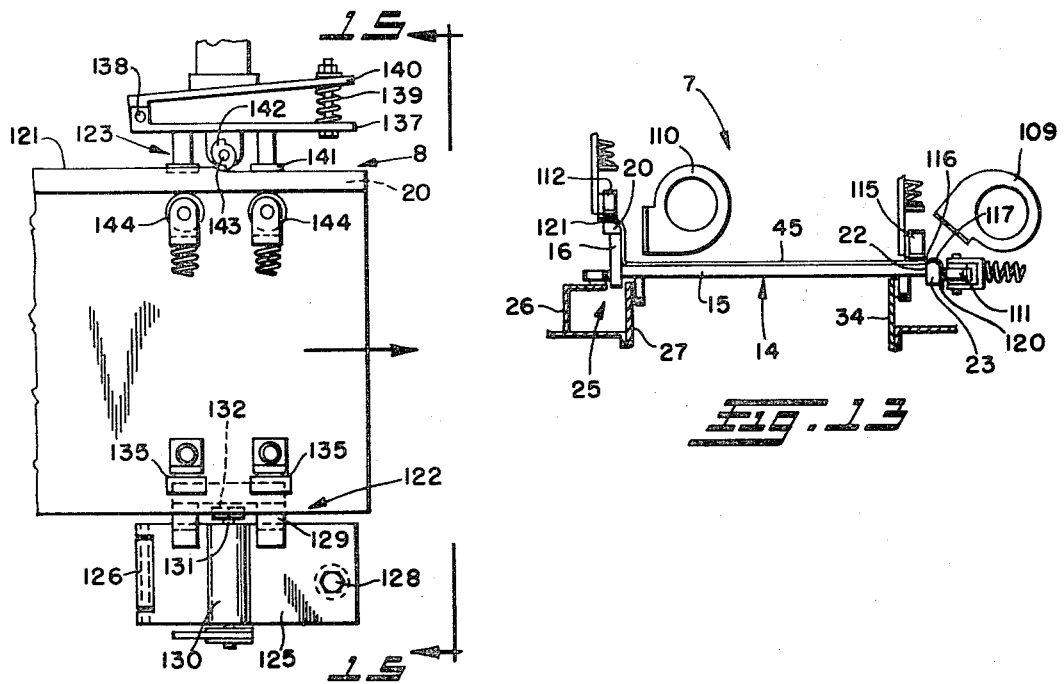

ABSTRACT OF THE DISCLOSURE

A plastic laminating apparatus for laminating plastic sheet material to a countertop core having a backsplash attached at right angles thereto during a single pass through the apparatus. The apparatus consists of a plurality of longitudinally spaced work stations through which the work is successively moved for progressively shaping and adhering the plastic laminate to the work, such work being guided through the apparatus by receipt of a downwardly projecting portion from the work in a guide track extending the entire length of the apparatus. A back die bends the laminate to conform to the general shape of the backsplash and countertop after heating, and fingers and pressure rolls are used to progressively bend and press the projecting edges of the laminate into firm contact with the edges of the countertop and backsplash. Floating cutters are also used to trim the excess laminate material extending beyond the countertop and backsplash edges and such excess material may be picked up by a suction blower or removed by a rotary brush prior to passage through final pressure rolls.

CROSS-REFERENCE TO RELATED APPLICATIONS

This application is a division of my copending United States application Ser. No. 114,290, filed Feb. 10, 1971, now U.S. Pat. No. 3,690,995, granted Sept. 12, 1972, which is a division of my copending United States application Ser. No. 885,014, filed Dec. 15, 1969, now U.S. Pat. No. 3,580,787, granted May 25, 1971.

BACKGROUND OF THE INVENTION

The present invention relates generally as indicated to plastic laminating apparatus, particularly for use in laminating countertop cores with backsplash affixed thereto in the final desired relation during a single pass through the apparatus.

Heretofore, it has been the usual practice to cover countertops and similar articles, ordinarily made of plywood or particle wood, with a protective and decorative laminate sheet of a suitable thermoplastic or thermosetting plastic material. The countertop generally includes a flat working surface to which the plastic laminate is bonded with the edge portions of the laminate extending outwardly beyond one or both edges of the core to permit further bonding of the laminate material to such core edges after heating the laminate edge portions and bending them to conform to the shape of the core edges in a progressive manner, as shown and described, for example, in U.S. Pats. 3,296,052 and 3,296,056.

When a backsplash was desired along the back edge of the countertop, the backsplash was usually covered with a plastic laminate in a similar manner but in a separate operation and subsequently attached to the countertop. This had the disadvantage that a crack was left exposed where the backsplash contacted the countertop, and two separate laminating operations and a subsequent bonding operation were also required to complete the assembly, which greatly increased both the manufacturing time and cost of the article.

A countertop manufacturing procedure has previously been devised for eliminating the crack between the backsplash and countertop by making the backsplash and countertop from a single flat piece of core material and bonding a sheet of laminate to both parts at the same time prior to shaping. However, this necessitated subsequent cutting of the core material from underneath to separate the countertop from the backsplash and reheating of the laminate to permit bending at the joint between the two parts, followed by insertion of a cove stick or the like between the countertop and backsplash on the back side to retain the backsplash at 90° with respect to the countertop, which increased rather than decreased the manufacturing time and expense. This procedure also sometimes resulted in the backsplash not being exactly at right angles to the countertop, and there was always the risk of damaging the laminate material during the subsequent cutting and bending operations.

SUMMARY OF THE INVENTION

With the foregoing in mind, it is a principal object of this invention to provide apparatus for laminating plastic sheet material to a countertop core and blacksplash fixed thereto in the final desired position during a single pass through the apparatus, at a substantial savings in time and reduction in cost.

Another object is to provide such an apparatus with novel guide means for guiding the countertop and backsplash core through the apparatus while maintaining proper orientation of the core at each of the laminate heating, forming, and bonding stations.

Still another object is to provide such an apparatus with novel indexing mechanism by which the laminate sheet material is properly located on the core prior to passage through the apparatus.

A further object is to provide such an apparatus with a novel forming die for back bending the laminate sheet material to conform to the general right angle configuration of the countertop and backsplash after heating.

Another object is to provide such an apparatus with ripple bars for maintaining proper edge position of the laminate sheet material during heating so that the edges are uniformly heated throughout their length.

A further object is to provide such an apparatus with floating cutters for trimming the excess laminate material from the edges of the backsplash and countertop cores after shaping and bonding the laminate material thereto.

Yet another object is to provide such an apparatus which readily accommodates different sizes of countertop and backsplash cores.

These and other objects of the present invention may be achieved by providing apparatus with a plurality of longitudinally spaced work stations through which the work is successively moved for progressively shaping and bonding the plastic laminate to the workpiece. The first station may be an indexing station at which the laminate is accurately placed on the work, and the apparatus has a guide track extending the entire length of the apparatus which receives a downwardly projecting portion on the work for accurately guiding the work through the apparatus. Ripple bars prevent the edges of the laminate material from curling when heat is applied to obtain more uniform heating of the laminate material, and a back die is used to bend the laminate to conform to the generally right angle configuration of the backsplash and countertop in a single operation. Forming rods and pressure rolls progressively bend and bond the projecting edges of the laminate to the front and top edges of the countertop and backsplash, respectively, and additional pressure rolls firmly adhere the laminate to the flat portions of the countertop and backsplash. Cooling fans may also be used to aid in cooling the laminate material after heating and shaping.

Floating cutters may be used for trimming any excess laminate material projecting beyond the backsplash and countertop edges, which excess material may be picked up by a suction blower, or a rotating brush may be used to remove such excess material from the laminate prior to passage between final pressure rolls.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principle of the invention may be employed.

BRIEF DESCRIPTION OF THE DRAWINGS

In the annexed drawings:

FIG. 1 is a diagrammatic top plan view of a preferred form of plastic laminating apparatus constructed in accordance with this invention shown in its entirety, with legends designating each of the work stations through which the work desirably passes during the laminating process;

FIG. 2 is a diagrammatic side elevation view of the apparatus of FIG. 1;

FIG. 3 is an enlarged fragmentary end elevation view of the apparatus of FIG. 2 as seen from the plane of the line 3—3 at the left end thereof adjacent the index station;

FIGS. 4 through 17 are schematic diagrams showing progressively the various steps which are followed in laminating a countertop and backsplash affixed thereto in the final desired position during a single pass through the apparatus of the present invention.

DESCRIPTION OF THE PREFERRED EMBODIMENT

Figure 15:
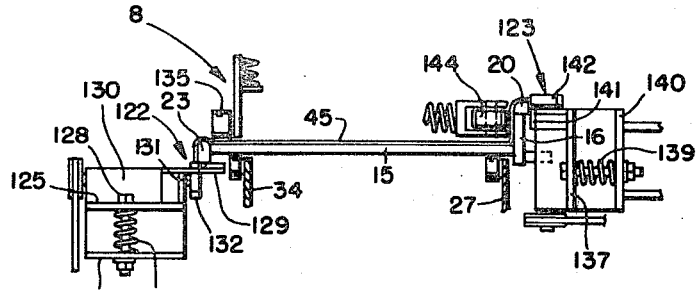

Referring now in detail to the annexed drawings and first of all to FIGS. 1 and 2, there is schematically shown a preferred form of apparatus 1 constructed in accordance with this invention, including a plurality of work stations 2–10. At the left end of the apparatus 1 is an index station 2 where the work is initially placed either by hand or automatically, and a sheet of plastic laminating material is initially adhered to the work, in a manner to be subsequently fully described. From the index station 2 the work is advanced to the forming station 3 where the laminating material is heated and die formed to conform to the general configuration of the work, which desirably consists of a countertop having a backsplash extending at right angles thereto.

Now the work is ready to be continuously progressively moved through the remainder of the apparatus 1, which generally comprises a pressing station 4 where a series of pressure rolls are used to firmly adhere the laminate to the work; an edge heating station 5 where the edges of the laminate material are heated; an edge forming station 6 where the heated edges are progressively bent and pressed into contact with the edges of the work; a cooling and pressing station 7 where the laminate material is cooled to permit it to set and additional pressure rolls press the laminate against the work; an edge trimming station 8 where the excess laminate material projecting beyond the edges of the work is removed and the resulting debris is desirably picked up by an overhead exhaust; a brush cleaning station 9 where any remaining debris may be brushed from the laminate material covering the countertop; and a pinch roll station 10 which finally presses the laminate material to the countertop core prior to passing onto a take-off conveyor 11 for removal from the apparatus.

As clearly shown in FIGS. 3 and 18, the work, generally designated by the numeral 14, desirably consists of a countertop core 15 and backsplash 16 preassembled in the final desired relation with the backsplash 16 and countertop 15 extending at right angles to each other and the backsplash 16 having a drop edge 17 extending downwardly below the bottom side 18 of the countertop 15, for a purpose to be subsequently described. The width of the countertop section 15 and vertical height of the backsplash section 16 may be varied as desired, and the overall length of the work 15 may also be varied without presenting any problems in handling by the apparatus 1 of the present invention. Along the upper edge 19 of the backsplash 16 there is a cap molding 20 having a rounded shoulder 21, and along the front edge 22 of the countertop 15 there is a front molding 23 which is desirably raised slightly above the upper side 24 of the countertop to prevent water from running off the front edge during use. Plywood or particle wood are the most common materials from which the backsplash and countertop cores and molding strips are made, and all of these parts may be secured together in any suitable manner, as by providing tongue and groove connections therebetween and using a suitable adhesive.

The work 14 is guided through the apparatus 1 by placement of the backsplash drop edge 17 of the work in a guide track 25 extending lengthwise of the apparatus adjacent the back side thereof (see, for example, FIGS. 1 and 3). The guide track 25 desirably consists of a pair of longitudinally extending guide rails 26 and 27 which are supported in closely spaced parallel relation on the main support frame 28 to provide a gap 29 therebetween for receipt of the backsplash drop edge 17. In the region of the index station 2, a plurality of longitudinally spaced horizontally disposed rollers 30 are provided on the horizontal flange portion 31 of the guide rail 26 which project inwardly beyond the flange portion 31 for rolling engagement with the back side of the drop edge 17, and similar longitudinally spaced rollers 32 may be vertically disposed on the vertical flange portion 33 of the guide rail 27 which project upwardly beyond the vertical flange portion 33 for rolling engagement with the underneath side of the countertop portion 15 of the work. A further guide rail 34 extending lengthwise along the front of the machine parallel to the guide rails 26 and 27 has a plurality of longitudinally spaced vertically disposed rollers 35 thereon which provide additional rolling support for the underneath side of the countertop core 15. An endless drive chain 38 running the full length of the apparatus carries detachable dogs 39 which engage the work for advancing the work through the various work stations while being guided by the guide track 25 as aforesaid.

For a more clear understanding of the details of construction and operation of the apparatus 1, reference will now be made to FIGS. 3 through 17, which schematically illustrate the various operations performed on the work 14 at each of the work stations. In FIG. 3, the work 14 is shown at the index station 2 with the countertop portion 15 supported from beneath by the support rails 27 and 34 and the backsplash drop edge 17 received in the guide track 25. Preferably, the upwardly and forwardly facing surfaces of the work are pre-sprayed with a suitable heat activated contact bond cement prior to placement of the work at the index station, but it will be apparent that the cement may be applied to the work while at the index station 2 if desired. Adjacent the front 40 of the index station 2 is a longitudinally extending indexing bar 41 supported by a pair of air cylinders 42 which when retracted cause the indexing bar 41 to press against the front molding 23 of the work 14 to lock the work in place against the guide rail 26. Teflon bumpers 43 or the like may be provided on the indexing bar 41 for contacting the work without sticking to the cement coating.

With the work 14 properly locked in place as aforesaid, a plurality of spacing strips 44 may be placed along the upper side of the countertop 15 to permit proper positioning of a sheet 45 of suitable plastic laminating material which has been pre-sprayed with the contact bond cement over the work 14 without actually contacting the work as shown in FIG. 4. The indexing bar 41 is desirably an angle bar which provides a gauge for locating the front edge 46 of the plastic laminate sheet 45 outwardly beyond the front molding 23 of the work a distance sufficient to provide enough material for covering the front molding during subsequent operations to be later described. Extending lengthwise of the index station 2 adjacent the back side 47 thereof is a Teflon covered rod 48 supported by vertical supports 49 from the main frame 28 above the backsplash 16 which initially maintains the plastic laminate sheet 45 out of contact with the top of the backsplash, as also shown in FIG. 4.

The spacing strips 44 project outwardly beneath the indexing bar 41 so that when the plastic laminating sheet 45 is in the proper desired position, the spacing strips 44 may be removed by pulling the strips from between the laminate sheet and countertop core from the front of the apparatus and the plastic sheet is lightly pressed into contact with the countertop core to hold the plastic sheet in place. Next the air cylinders 42 are extended to disengage the indexing bar 41 from the front molding 23 and plastic sheet 45, and the work 14 with plastic sheet adhered thereto is indexed to the forming station 3 by advancing the work along the guide rails 27 and 34 by hand or by engagement of a detachable dog 39 on the active chain 38 with the trailing end 50 of the work, as desired. During such movement, the plastic sheet 45 slides off the end of the rod 48 into contact with the top of the backsplash.

When the work 14 is in position at the forming station 3 as shown in FIG. 5, movement of the work is stopped, and a tip bar 51 located beneath the work 14 between the drive chain 38 and front guide rail 34 is raised by actuation of a pair of air cylinders 52 supported by the main frame 28 to tip the work 14 at a slight angle to the FIG. 6 position. This locks the work in the guide track 25 and provides clearance for pivoting a forming die into the corner 53 between the backsplash 16 and countertop 15 as described hereafter. To obtain more accurate positioning of the work 14 at the forming station 3, a horizontal slide bar 54 may be substiuted for the rollers 30 on the support rail 26, and a series of longitudinally spaced vertical spacers 55 may be provided on the support rail 27 in place of the vertical rollers 32.

In the region of the forming station 3 the main support frame 28 has plural overhead supports 58 to which is pivoted a heater support frame 59 for swinging movement of an infrared heater 60 from the retracted or inoperative position shown in FIG. 5 to the operating position shown in FIG. 6 directly over the area of the laminate sheet 45 which is to be die formed to conform to the right angle configuration of the backsplash and countertop after heating. An operating lever 61 may be provided for moving the heater 60 by hand between the inoperative and operative positions, with a suitable toggle mechanism, not shown, desirably being provided for releasably retaining the heater in either position. The heating cycle may, of course, be varied depending upon the type of plastic material being used, but once determined, an automatic timer may be used for controlling the heat cycle. In the preferred form of the invention illustrated in the drawings, a heating cycle of 30 seconds is used to bring the material temperature to approximately 350° F.

To prevent the back edge 64 of the plastic sheet 45 from curling toward the heater 60 during the heating cycle, a ripple bar 65 may be provided, pivotally mounted at its ends to the main frame 28 at the back of the machine by lever arms 66. Vertical extensions 67 on the lever arms 66 are adapted to be engaged by rollers 68 carried by the heater support frame 59 for movement of the ripple bar 65 into and out of position simultaneously with the heater 60 movements. During movement of the heater 60 to the operative position shown in FIG. 6, the weight of the ripple bar 65 maintains the vertical extensions 67 in contact with the rollers 68 on heater support frame 59. The ripple bar 65 continues to move in a generally clockwise direction as seen in FIG. 6 with the movement of the heater 60 until the downward projections 72 from the ripple bar lever arms 66 engage a stop 73 on the main frame 28 for properly locating the ripple bar 65 in position overlying the back edge of the sheet of laminate material thus to retain the back edge in place. The heater 60 moves still further to the final desired operating position shown in FIG. 6, after which the heater 60 is energized to cause uniform heating of the plastic material in the region directly beneath the heater.

Following the heating cycle, operating lever 61 is again actuated to retract the heater 60 to the inoperative position. During such upward swinging movement of the heater, the roller 68 on the heater support frame 59 engages the ripple bar lever arm extensions 67 also to retract the ripple bar 65 to its inoperative position shown in FIGS. 5 and 7.

Now the plastic laminate sheet 45 is ready to be die-shaped using an elongated forming die 70 which is pivotally mounted to the front of the forming station 3 by plural support beams 71. A plurality of air cylinders 72 pivotally connected to the overhead supports 58 may be provided for raising and lowering the forming die 70 into and out of engagement with the plastic laminate. A pressure plate 75 carried by the forming die support beams 71 engages the plastic laminate sheet prior to engagement by the forming die to hold the laminate sheet against the work during the forming operation to prevent air from becoming entrapped beneath the laminate and pushing the laminate away from the work. The pressure plate 75 is shown supported on the forming die support beams 71 by adjustable yokes 76 which permit continued movement of the forming die 70 toward the work after engagement of the pressure plate 75 with the plastic laminate sheet. Support beams 77 provide a pivotal mount for the pressure plate 75 to the front of the main frame 28.

As clearly shown in FIGS. 6 and 7, the forming die 70 is of angular cross section, somewhat less than 90°, with a slight radius along the inner edge 78 thereof to permit pressing of the laminate material into the corner 53 between the backsplash 16 and countertop 15 during the die forming operation. Moreover, it will also be apparent that the slight tilting of the work 14 at an angle as previously described permits the forming die 70 to clear the backsplash 16 during downward swinging movement into the corner 53. Preferably, the forming die 70 is comprised of two strips 79 and 80, desirably made of wood such as birch, secured to an angle bar 81. The advantage in using wood for the die strips is that wood is not a conductor of heat.

After the die forming operation, the forming die 70 is retracted to the FIGS. 5 and 6 position, retracting the pressure plate 75 with it, and the tip bar 51 is lowered to the FIG. 5 position to permit reengagement of the work with the front guide rail 34 for supporting the work during movement through the succeeding work stations 4 through 10 as the work is pulled along by a detachable dog 39 on the drive chain 38. The plastic laminate sheet 45 now generally conforms to the right angle configuration of the backsplash 16 and countertop 15, with opposite edges 81 and 82 of the laminate sheet extending in planes 90° to each other beyond the respective molding strips 23 and 20 on the countertop 15 and backsplash 16, as shown in FIG. 7.

From the forming station 3, the work 14 is progressively moved through the pressing station 4 while the plastic laminate sheet 45 is still hot to facilitate pressing of the plastic laminate sheet into tight contact with the countertop 15 and backsplash 16 using rubber pressure rolls 85 and 86 as shown in FIGS. 8 and 9, respectively. Both the countertop pressure rolls 85 and backsplash pressure rolls 86 are preferably spring loaded and adjustable to permit application of a uniform pressure to the laminate material, and the pressure rolls are desirably located as close as practical to the corner 53 of the work to press the laminate material which was not contacted by the forming die 70 during the die forming operation into firm contact with the work. Two sets of backsplash pressure rolls 86 are desirably provided, one set vertically spaced from the other. The lower pressure rolls 86 are used for pressing the laminate material against backsplashes which are relatively short as shown in solid lines in FIG. 9, whereas both pressure rolls 86 are used to press the laminate against higher backsplashes as shown in phantom lines in FIG. 9. The same or separate mounts 90 may be provided for each pair of vertically spaced pressure rolls 86, and two sets of skid bars 91 and 92 are also desirably provided, one located higher than the other adjacent the back of the pressing station 4 for providing the necessary support for backsplashes of different heights during pressure engagement by the pressure rolls 86.

Next the work 14 is progressively moved through the edge heating station 5 where a plurality of infrared heaters 95 and 96 supported adjacent the back and front of the apparatus progressively heat the projecting edges 81 and 82 of the laminate sheet material 45 which are at 90° to each other. Ripple bars 97 and 98 carried by the respective heaters 95 and 96 project outwardly at an angle adjacent the laminate edges and prevent such edges from curling toward the heaters during the heating operation, resulting in more uniform heating of the laminate edges. The ripple bars 97 and 98 are desirably made of asbestos or other similar heat resistant material rather than metal to avoid scorching of the laminate material. Additional pressure rolls 99 may also be provided in the region of the edge heating station 5 to assist in firmly adhering the laminate sheet material to the work.

After leaving the edge heating station 5, the work 14 immediately enters the edge forming station 6 where a pair of angularly disposed forming bars or fingers 105 and 106 positioned adjacent the front and back of the apparatus progressively turn the projecting edges 81 and 82 of the laminate sheet material over the front molding 23 and backsplash cap molding 20 as schematically shown in FIGS. 11 and 12. The progressively bent projecting edge portions 81 and 82 are then intermittently pressed into contact with the front and cap moldings 23 and 20 by a series of adjustable rubber forming rolls 107 and 108 mounted in spaced apart relation along the front and back of the apparatus. As illustrated, the forming rolls 107 have vertical axes and are spring loaded in a horizontal direction for urging the forming rolls 107 into engagement with the front face of the front molding 23, whereas the forming rolls 108 have horizontal axes and are spring loaded downwardly for urging the forming rolls into engagement with the top of the cap molding 20. Additional pressure rolls, not shown, may also be provided for pressing the laminating material against the top surface of counter top 15 and front surface of backsplash 16, since the previous heating operation has a tendency to reactivate the contact bond cement used to bond to laminate sheet material to the work.

Next the work 14 continues to move through the cooling and pressing station 7 where fans 109 and 110 located adjacent the front and back of the apparatus direct cooling air against the laminate edges to promote setting of the plastic while additional pressure rolls 111 and 112 disposed at right angles to each other adjacent such front and back continue to press the laminate material against the front molding 23 and cap molding 20 as shown in FIG. 13. Additional pressure rolls 115 are also provided which press the plastic laminate material to the countertop 15 along the front edge 22 thereof to form a die line 116 where the front molding 23 is attached to the countertop 15, creating a raised portion 117 which prevents water from running off the countertop when in use.

Any overhang 120 and 121 of the plastic laminate material 45 extending downwardly below the bottom of the front molding 23 and outwardly beyond the back of the cap molding 20 after the edge forming and pressing operations may be removed during passage of the work through the edge trimming station 8 where cutters 122 and 123 are mounted adjacent the front and back of the apparatus as shown schematically in FIGS. 1 and 2 and in greater detail in FIGS. 14 and 15. The front edge cutter 122 generally comprises a stationary base plate 124 to which is pivotally connected a floating support plate or head 125 for vertical movement about a horizontal pivot 126 toward and away from the bottom of the front molding 23. The support plate 125 is urged upwardly by a spring 127 disposed between the plates 124 and 125 and an adjustable bolt 128 extending through the spring and plates limits the extent of such upward movement of the floating support plate 125. Carried by the floating support plate 125 is a guide shoe 129 adapted to engage the underneath side of the front molding 23. Also carried by the support plate 125 is a journal mount 130 having a horizontal shaft 131 extending perpendicular to the front edge of the work on which is mounted a carbide cutter blade 132.

The size of the cutter blade 132 is such that its periphery projects the same vertical extent as the guide shoe 129, and the cutter blade 132 is in longitudinal alignment with the front bottom edge of the front molding 23. Holddown rolls 135 carried by the main frame 28 press against the front edge of the work to maintain the bottom of the front molding 23 against the guide shoe 129, whereby regardless of the configuration of the bottom edge of the front molding 23, the cutter blade 132 is caused to follow such surface and neatly trim the overhang 120 from the front molding.

The back edge cutter 123 is of a similar construction, but the floating cutter head or plate 137 has a vertical pivot 138 and is urged toward the back side of the cap molding 20 by a spring 139 disposed between the cutter head 137 and a fixed support plate 140. A guide shoe 141 and cutter blade 142 are also carried by the cutter head 137, but the cutter blade has a vertical support shaft 143 instead of a horizontal support shaft, and is in longitudinal alignment with the upper back edge of the cap molding 20. Pressure rolls 144 carried by the main frame 128 maintain the cap molding 20 from moving forward out of contact with the guide shoe 141, whereby the guide shoe 141 and cutter blade 142 follow the contour of the cap molding 20 to trim the backsplash overhang 121, thus assuring a neat finish.

Figure 16:
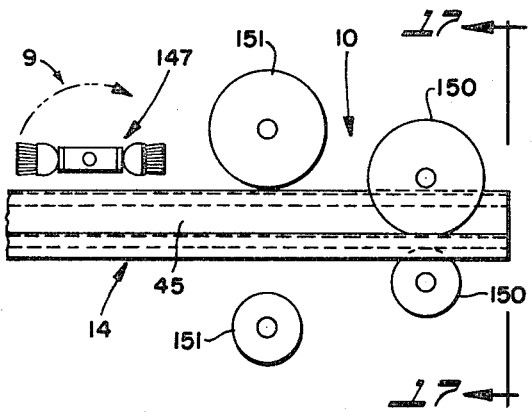

A suction blower 146, shown schematically in FIG. 2, may be provided overhead for removing the debris resulting from the edge trimming operation, and a rotating brush 147 shown schematically in FIGS. 1, 2 and 16 may also be provided at the brush cleaning station 9 for cleaning the countertop prior to passage through the pinch roll station 10, if desired. The brush 147 may be driven off the same drive for the main conveyor chain 38 or be independently driven.

Figure 17:
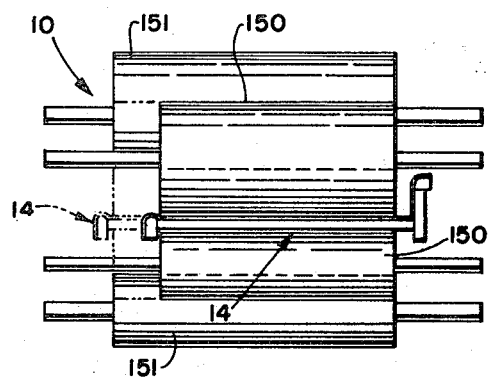

As clearly shown in FIGS. 1 and 2 and schematically illustrated in FIGS. 16 and 17, the pinch roll station 10 desirably consists of two pairs of vertically spaced rubber covered rolls 150 and 151. One pair of rolls 150 is preferably shorter than the other pair 151 for use with different width countertops. The shorter pair of rolls 150 is for vanity tops which are usually approximately 22¼ inches wide, and the longer pair 151 are for standard sink tops which are usually approximately 25¼ inches wide.

When a vanity top is being processed, the longer rolls 151 are moved apart and only the shorter pair of rolls 15 are used to firmly press the plastic laminate to the flat part of the top as shown schematically in solid lines in FIG. 17. However, when a standard sink top is being processed, the longer pair of rolls 151 are pressed against the work as shown in phantom lines in FIG. 17, and the shorter rolls 150 are also desirably used. Air cylinders 155 may be mounted at opposite ends of each of the rolls 151 for moving the journal mounts 156 for each of the rolls along vertical guideways 157 toward and away from each other, whereas only the top roll 150 of the first pair of rolls need be mounted for vertical movement to vary the pressure applied by the rolls 150 against the work, as shown in FIG. 2.

Figure 18:
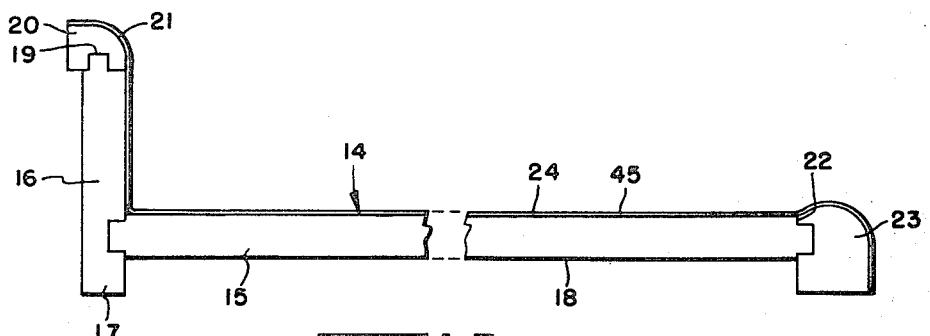
FIG. 18 is a fragmentary end elevation view of a completely laminated countertop and backsplash made using the apparatus of this invention.

After passing through the pinch roll station 10, the work is in the finished form illustrated in FIG. 18, and passes onto a take-off conveyor 11 where the work may be removed or guided somewhere else for further processing. The completed countertop with backsplash attached thereto may then be cut to any desired length and mitered right or left or kept straight, as desired.

From the foregoing, it can now be seen that the apparatus 1 of the present invention, which may have an overall length of from 60 to 70 feet, applies a plastic laminate sheet to a countertop and backsplash already preassembled in the final desired relation during a single pass through the apparatus, without requiring additional operations to be performed to the work after exiting from the apparatus. In actual practice, it has been found that a preassembled countertop and backsplash may be completely covered with a plastic laminate using such apparatus within 40 to 60 seconds, and only one man is required to operate the apparatus. In contrast, it previously took from six to eight minutes and two men to form a completed countertop with backsplash attached thereto using previous known apparatus in which the countertop and backsplash are first laminated in the flattened condition and subsequently cut and reformed to secure the backsplash in the final desired relation at 90° with respect to the countertop.

The unique guide track which guides the work through the apparatus also assures proper orientation of the work with respect to the equipment at each of the operating stations, and the apparatus may also be readily adjusted to accommodate countertops of different widths. Since the backsplash is always maintained in the same general longitudinal path by the guide track, only the equipment which operates on the front edge of the countertop core need be adjustable, and this is readily accomplished by mounting the front edge heater 96, front edge forming 105 and pressure rolls 107, 111, front edge cooling blowers 109 and front edge cutter 122 on a common bed plate 160 for lateral movement toward and away from the guide track 25 as shown schematically in FIG. 1. A pair of screw shafts 161, 162 threadedly engaging the bed plate 160 and connected together by a chain 163 permit adjustment of the bed plate by rotation of one of the screw shafts. Slight variations in the height of the backsplash may also be readily accommodated for by making slight vertical adjustments in the equipment which acts on the top edge of the backsplash.

The provision of two sets of vertically spaced pressure rolls 86 and vertically spaced skid bars 91 and 92 at the pressing station 4 already allows for some variation in the vertical height of the backsplash. Where additional vertical adjustment is desired, such equipment may be mounted on a vertically movable bed plate similar to the horizontally movable bed plate shown in FIG. 1. The use of ripple bars for obtaining uniform heating of the laminate material and floating cutters for trimming the overhang also results in increased quality of the work produced by the apparatus of the present invention.

I, therefore, particularly point out and distinctly claim as my invention:

1. Indexing apparatus for accurately draping a sheet of plastic laminating material over a workpiece having a horizontal portion and a back portion at substantially right angles thereto comprising a stationary support, an indexing bar, means mounting said indexing bar for horizontal movement into and out of engagement with the front edge of such workpiece for releasably pressing such workpiece against a portion of said stationary support to lock such workpiece in place, means for orienting the plastic laminating material with respect to the workpiece, and means for initially maintaining such plastic laminating material out of contact with such workpiece until properly oriented with respect to such workpiece.

2. The apparatus of claim 1 wherein said means for orienting the plastic laminating material comprises said indexing bar which is angularly shaped to receive an edge of the plastic laminating material extending outwardly beyond the front edge of such workpiece.

3. The apparatus of claim 1 wherein said means for initially maintaining such plastic laminating material out of contact with the horizontal portion of the workpiece comprises a plurality of removable spacing strips adapted to be placed along the upper edge of such horizontal portion, said spacing strips extending outwardly beyond said indexing bar to permit withdrawal of said spacing strips from between such plastic laminating material and workpiece.

4. The apparatus of claim 1 wherein said means mounting said indexing bar for horizontal movement comprises a pair of cylinders mounted on said stationary support and connected to said indexing bar for moving said indexing bar relative to said stationary support.

5. The apparatus of claim 1 further comprising bumpers on said indexing bar having means thereon for contacting the workpiece without sticking.

6. The apparatus of claim 1 wherein said means for initially maintaining such plastic laminating material out of contact with the back portion of the workpiece comprises a horizontal rod supported above such back portion and adjacent thereto.

7. The apparatus of claim 6 wherein said rod is covered with Teflon to prevent sticking of the plastic laminating material thereto.

8. The apparatus of claim 1 wherein the back portion of such workpiece has a downwardly projecting portion extending below such horizontal portion, and said stationary support includes a guide track extending lengthwise of the apparatus which closely receives such downwardly projecting portion of the workpiece, said guide track comprising a pair of longitudinally extending guide rails, one of said guide rails being the portion of said stationary support against which such downwardly projecting portion of the workpiece is pressed by said indexing bar.

9. The apparatus of claim 8 further comprising rollers on said guide rails providing rolling engagement with the downwardly projecting portion and underneath side of the horizontal portion of such workpiece.

10. The apparatus of claim 8 wherein said stationary support further includes another guide rail spaced from said pair of guide rails to provide additional support for the horizontal portion of the workpiece.

References Cited

UNITED STATES PATENTS 3,492,182  1/1970  Howard _____ 156—538

DOUGLAS J. DRUMMOND, Primary Examiner